United States Patent [19]
De Vito et al.

[11] Patent Number: 5,764,771
[45] Date of Patent: Jun. 9, 1998

[54] METHOD FOR PROCESSING A DIGITAL SIGNAL IN A SO-CALLED SECURE COMMUNICATION SYSTEM AND USE OF THIS METHOD FOR ACCESS CONTROL AND/OR BINARY SIGNATURE

[75] Inventors: Mario De Vito, Geispolheim; Jacques Stern, Paris; Louis Gregoire, Rennes; Jean-Bernard Fischer, Strasbourg, all of France

[73] Assignee: Thomson multimedia S.A., Courbevoie, France

[21] Appl. No.: 662,625

[22] Filed: Jun. 13, 1996

[30] Foreign Application Priority Data

Jul. 3, 1995 [FR] France .................. 95 08004

[51] Int. Cl.$^6$ .................................. H04K 1/00
[52] U.S. Cl. ............................ 380/28; 380/49
[58] Field of Search ........................ 380/28, 49

[56] References Cited

U.S. PATENT DOCUMENTS

Re. 33,189  3/1990  Lee et al. ................. 380/20
5,115,467   5/1992  Esserman et al. .......... 380/44

FOREIGN PATENT DOCUMENTS 0605289  7/1994  European Pat. Off. ......... H04L 9/32

OTHER PUBLICATIONS

Copy of Search Report.

*Primary Examiner*—David C. Cain
*Attorney, Agent, or Firm*—Joseph S. Tripoli; Frederick A. Wein; Robert D. Shedd

[57] ABSTRACT

The present invention relates to a method of processing a digital signal of dimension k, in a so-called secure communication system, such that the digital signal (y) at output cannot be deduced from the digital signal (x) at input, consisting in dispatching the digital signal (x) to a device effecting a one-way function.

The method includes the following steps:
  the digital signal (x) at the input is dispatched to a circuit C (1, 2) which gives as output a digital signal (x") of dimension n acceptable to the one-way function;
  the signal (x") from the circuit C (1, 2) is dispatched to the circuit effecting the one-way function giving as output the digital signal (y).

The invention applies in particular to so-called secure communication systems.

18 Claims, 2 Drawing Sheets ance to calculate the
control word m from the control word selector m without
knowing a certain secret, the shared key, which is located in
two secure domains: the sender and the receiver.

METHOD FOR PROCESSING A DIGITAL SIGNAL IN A SO-CALLED SECURE COMMUNICATION SYSTEM AND USE OF THIS METHOD FOR ACCESS CONTROL AND/OR BINARY SIGNATURE

FIELD OF THE INVENTION

The present invention relates to a method of processing a digital signal of dimension k such that the digital signal at output cannot be deduced from the digital signal at input.

BACKGROUND OF THE INVENTION

This type of method is particularly useful in so-called secure communication systems. These systems are in general conditional-access systems requiring the use of a control word or a signature. The systems employing this type of secure communications are very numerous. In particular may be cited subscription television systems, banking type systems making it possible to handle standing orders or any other systems of the same type giving rise to exchanges of confidential information.

In conditional-access systems, such as those implemented in subscription television systems, use is generally made of a digital signal of n bits forming a control word making it possible, in particular, to control the scrambling and unscrambling of the information transmitted. This control word must be frequently changed and is, in general, transferred from a sending station to the receiving system or terminal.

This control word must be accessible only to the authorized person. Therefore, this control word is enciphered during transmission to the receiver which is a secure system such as a smart card. This receiver may perhaps be paired with a non-secure unscrambling system and it then provides the latter with the control word after decipherment. In order to carry out this type of transaction, a secret key cryptographic system is used in which the sender and the receiver share a common digital signal termed the common secret key. Therefore, the sender enciphers the control word and the receiver deciphers it by a symmetrical operation.

In order to carry out this type of operation, various methods of processing are known by those skilled in the art. Thus, the DES, standing for "Data Encryption Standard", system may in particular be mentioned.

This process has the drawback that it is necessary to use a reversible function in order to encipher and then decipher the message. However, certain problems do not require the use of a fixed and significant digital signal which would be enciphered and deciphered; it is often sufficient for the forwarder and the recipient to be able to share a confidential random digital signal. It is then sufficient to use a one-way function, that is to say a function which does not allow an image of the digital signal to be found if the said function is not known perfectly. In particular, a key-based hash function may be used, the principle of operation being known but not exploitable without a valid key.

Thus, as represented in FIG. 1 which relates to the use of a one-way function, a random digital signal m termed the control word selector is drawn at random by the sender E including a random digital signal generation circuit referenced A. Its image under the one-way function f is then the confidential random digital signal shared by the sender E and the receiver R, henceforth termed the control word. The sender transmits the control word selector m to the receiver and both calculate its image under the one-way hash function f with the same key, thus obtaining the same control word m. The only constraint imposed in respect of confidentiality is that it must be impossible to calculate the control word m from the control word selector m without knowing a certain secret, the shared key, which is located in two secure domains: the sender and the receiver.

The state of the art is to use either cryptographically safe reversible functions, for example the DES, or to use cryptographically weak functions whose only defence is the computational complexity and the secrecy of the structure, which amounts to saying that the key is the function itself and what limits its use is its universality.

SUMMARY OF THE INVENTION

The purpose of the present invention is to propose a method for processing digital signals which in particular addresses this problem, in so far as the function is public and that only one key of limited size is kept secret. The compromising of a key does not endanger the systems which use the same scheme with a different key.

The purpose of the present invention is also to propose a method of processing which can be used in all digital signal transmission systems of secure type.

Consequently, the subject of the present invention is a method of processing a digital signal of dimension k in a so-called secure communication system, such that the digital signal (y) at output cannot be deduced from the digital signal (x) at input, consisting in despatching the digital signal (x) to a device effecting a one-way function, characterized in that the processing includes the following steps:

the digital signal (x, x1) at the input is dispatched to a circuit C (1, 2, 4) which gives as output a digital signal (x, x'1) of dimension n acceptable to the one-way function;

the signal (x', x'1) from the circuit C (1, 2, 4) is dispatched to the circuit (3, 5) effecting the one-way function giving as output the digital signal (y).

According to one embodiment, the one-way function is effected by multiplying the digital signal (x") by a matrix M of dimensions n×m whose coefficients $a_{ij}$ are chosen randomly once and for all. A function of this type is described for example in French Patent Application No. 92 15915 in the name of Jacques Stern.

Preferably, in order in particular to limit memory storage, the coefficients $a_{ij}$ of the matrix are generated by a pseudo-random function.

According to this embodiment, the scrambling circuit is chosen so as to exhibit good spreading qualities, that is to say a very weak modification of the signal at input causes a large difference in the signal at output. Preferably, the scrambling function is controlled by a secret key (S).

Similarly, the purpose of the formatting circuit is to transform the signal at input into a data item of dimension n bits and of weight approximately d, d being determined by the Gilbert-Warshamov bound: $m=n.H_2(d/n)$ where $H_2(x)$ is the entropy function $$H_2(x) = -x \log_2(x) - (1-x) \log_2(1-x).$$

According to a preferential embodiment, m=n/2; the weight of the digital signal input to the one-way function must be approximately 0.11×n.

In the context of the present invention, the scrambling and formatting functions can be effected in accordance with one of the following three processes, namely:

either a scrambling circuit of known type and a formatting circuit whose input defines a permutation over a binary word of length n and weight d, either a scrambling circuit of known type and a formatting circuit whose input defines in one way a linary word of length and of weight d, or a single scrambling and permuting circuit whose input and secret key define a pseudo-random generator biased such that the output word of length n is of weight d or thereabouts with a very high probability.

The subject of the present invention is also the use of the method described above to generate a control word in access control systems and in particular in the case of a subscription television system in order to generate the control word or words by using the same one-way function at sender level and at receiver(s) level.

BRIEF DESCRIPTION OF INVENTION

Other characteristics and advantages of the present invention will emerge on reading the detailed description of various embodiments, the description being given with reference to the appended drawings in which:

FIG. 1 already described represents diagrammatically the use of a one-way function when transmitting a digital signal between a sender and a receiver;

DETAILED DESCRIPTION OF INVENTION

The method and the device according to the present invention are based on the problem of syndrome decoding (SD) described in French Patent Application No. 92 15915in the name of Jacques Stern which can be explained as follows: consider a binary matrix M and a binary vector y, it is required to find a binary vector x of relatively high or relatively low weight such that Mx=y. Weight is understood to mean the number of 1bits in the relevant vector. The problem posed above is in fact very difficult to solve by presently known computational means if the dimensions n×m of the matrix M and the Hamming weight of the vector x are chosen judiciously. It has been proven that with current computational means the problem is very difficult when the digital signal x at input has a low Hamming weight d. Generally, the parameters d, n, m giving the Hamming weight and the dimensions of the matrix M are chosen substantially below the Gilbert-Warshamov bound giving a theoretical limit value for the minimum weight d of a random code (n, m), namely:

$$m = n.H_2(d/n)$$

where $H_2(x)$ is the entropy function $H_2(x) = -x.\text{Log}_2(x) - (1-x)$.

Figure 1:
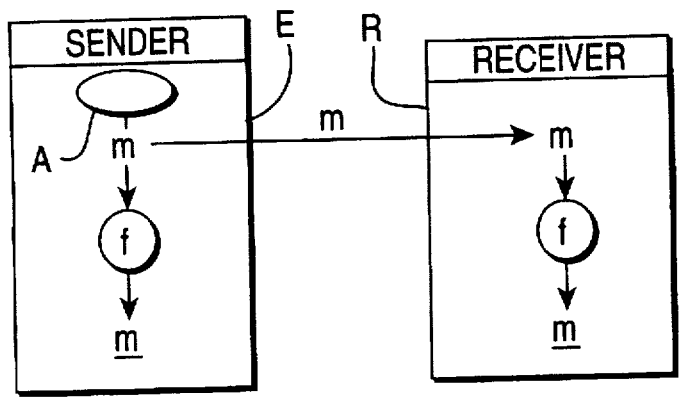
Figure 2:
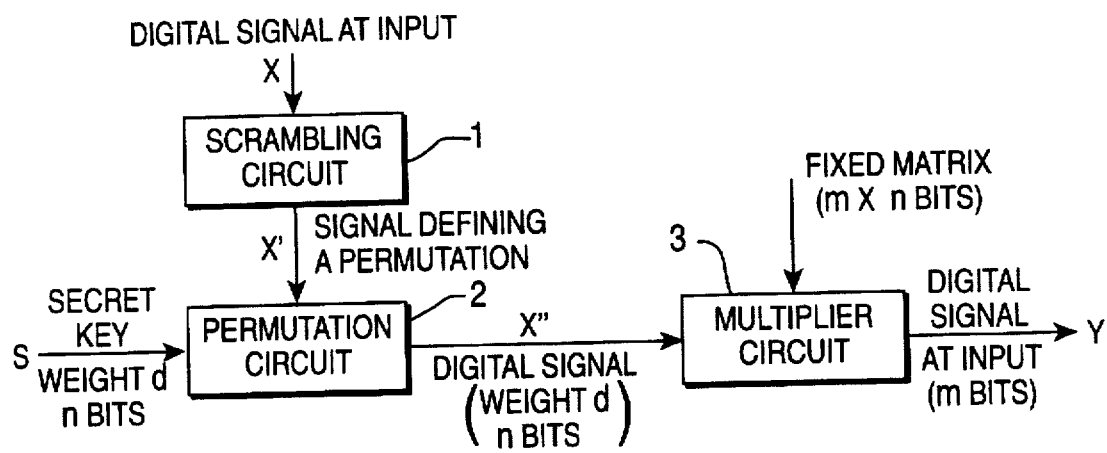
FIG. 2 is a diagram representing a device making it possible to obtain a digital signal at output which cannot be deduced from the digital signal at input.

Represented diagrammatically in FIG. 2 is a device making it possible to implement a first method of processing a digital signal such that the digital signal at output cannot be deduced from the digital signal at input.

In this device, the digital signal at input (x) is dispatched to a scrambling circuit (1) of a type known to those skilled in the art. This digital signal is a signal consisting of binary words of dimension k. A digital signal (x') defining a permutation which is dispatched to a permuting circuit (2) is obtained at output.

This circuit has two inputs: one accepts the definition of the permutation, the other the binary word to which this permutation is applied; the permuted word is obtained at output. The circuit receives the signal (x') on the first input and on the second input a secret key (S) which, in the embodiment described, consists of a binary digital signal of n bits having a weight d such as defined earlier. Hence, a random digital signal (x") containing n bits and having a weight d is obtained at the output of the permuting circuit (2).

This signal (x") is dispatched to a multiplier circuit (3) which undertakes the matrix multiplication of the n-bit binary word at input with a fixed binary matrix of dimensions n×m bits. An m-bit digital signal (y) is obtained at output.

In the scheme described above, the digital signal at input (x) is used to permute the secret key (S). For reasons of security, the digital signal at input is firstly scrambled and the result is used to define a permutation over n bits. The scrambling may be relatively simple, since it is sufficient for the bits to be well spread, that is to say for the value of a bit of the signal at input to affect the value of many bits at output. Numerous possibilities are available here to those skilled in the art, for example the use of correspondence tables or pseudo-random generators.

The definition of a permutation over n bits can be undertaken by defining the image of each bit or else by using a permutation generator of a type known to those skilled in the art, such as described for example in the article by M. Luby & C. Rackoff, "How to construct pseudo random permutation from pseudo random functions", SIAM.J of computing 17(2) April 1988, this requiring less data at input. The need to store the whole of the secret key can be avoided by using an n-bit key in which the first few bits are 1s and all the others 0s. In this case, the key is no longer secret and the entire "secrecy" of the scheme lies in the scrambling of the digital signal at input which must be sufficiently good for the security required.

The matrix of dimensions m×n bits consists of coefficients $a_{ij}$ which have been chosen randomly once and for all. This matrix is stored in a memory. To avoid storing the whole of the matrix M, it is possible, in a known manner, to generate each coefficient $a_{ij}$ by way of a pseudo-random function.

The digital signal (y) at output having a dimension of m bits can be used as control word in all access control systems. In the case of a subscription television system, the digital signal (y) at output can equally well be generated at sender level as at receiver(s) level.

Figure 3:
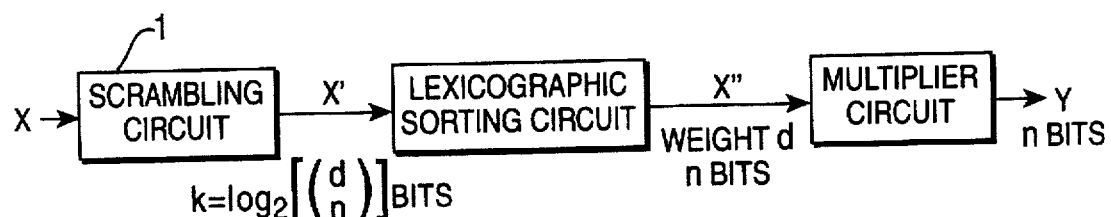
FIG. 3 is a diagrammatic representation of another device making it possible to obtain a digital signal at output which cannot be deduced from the digital signal at input.

Another method of processing a digital signal of dimension k such that the digital signal at output cannot be deduced from the digital signal at input will now be described with reference to FIG. 3, together with a device for implementing this method. In the case of FIG. 3, the digital signal (x) at input is sent on a scrambling circuit (1) of a known type to those skilled in the art. This digital signal is a signal constituted by binary words of dimension k. A digital signal (x') giving in one way the index of a word in a lexicographic sorting of all possible words of weight d and length n is obtained on the output.

A preferred method for formatting the signal (x') into a word of weight d and length n is to used a lexicographic sorting well known by those skilled in the art. Thus, it is possible to define a word of weight d and length n with a minimum of bits, i.e. the logarithm in base 2 of the number of combinations of d amongst n. k will have this value.

The following algorithm is a lexicographic sorting method.

Input
V : value of the index
n : length of the word
d : weight of the word
Output :
Series of bits of length n and weight d
1. C=number of combinations of d amongst n
2. if n > 0
  a) C'=C (n−d)/n
  b) if V≦C'
    output the bit 0
    C=C'
  c) If not
    output the bit 1
    i=i−C'
    C=C.d/n
  d) n=n−1

Figure 4:
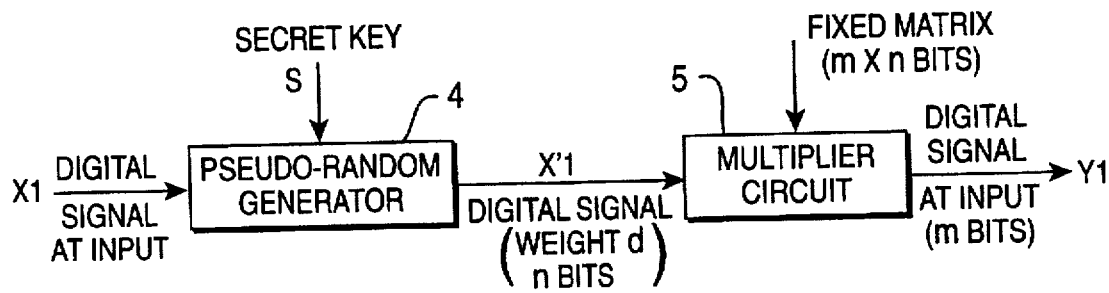
FIG. 4 is a diagrammatic representation of still another device making it possible to obtain a digital signal at output which cannot be deduced from the digital signal at input.

Another method of processing a digital signal of dimension k such that the digital signal at output cannot be deduced from the digital signal at input will now be described with reference to FIG. 4, together with a device for implementing this method. In the case of FIG. 4, the digital signal ($x_1$) at input, which is a signal containing k bits, is dispatched to a pseudo-random generator (4) at the same time as a secret key consisting of a digital signal (S).

The pseudo-random generator is chosen in such a way that for a dimension n the digital signal at output has a fixed Hamming weight d with high probability, n depending on the circuit which effects the unidirectional function. Thus, a random digital signal ($x'_1$) of length n bits and having a weight of around d is obtained at the output of the pseudo-random generator. The signal ($x'_1$) is next dispatched to a multiplier circuit (5) where it is multiplied by the coefficients of a fixed matrix having dimensions m×n bits so as to give at output a digital signal ($Y_1$) having a length of m bits. The fixed matrix is a matrix identical to that described with reference to FIG. 2.

The use of a pseudo-random generator of good quality to obtain the random digital signal affords a spread which is sufficient for our application. Therefore, if the key remains secret, the scrambling is sufficiently good to afford good security even if the digital signal at input is known.

However, the use of a pseudo-random generator to define the binary settings of the digital signals causes a problem. Indeed, certain settings may be produced more than once. In the case in which the memory for storing the binary settings of the signals is adequate, it is possible simply to eliminate the redundant value and draw out another, but if it is not possible to store them, in particular when the computation is performed in a smart card, then the weight of the random digital signal can be smaller than the number of settings drawn. This must be taken into account and it is necessary to draw more items of information than the weight in order to obtain the desired value on average. When the weight of the words input to the unidirectional function need not be exactly d, but perhaps a value which is close thereto, this method is then valid provided that the statistical distribution of the non-redundant values is calculated. Thus, if it is sought to obtain an average value of 56 non-redundant settings, it will be appreciated that 59 settings must be drawn and 25% of the draws come out at exactly 56, 66% between 55 and 57 and 98% between 53 and 59.

Another embodiment of the system will now be described making it possible to implement a method of processing a digital signal such that the digital signal at output cannot be deduced from the digital signal at input, in which starting from a single digital signal at input it is possible to obtain several digital signals at output which meet the said criteria.

Figure 5:
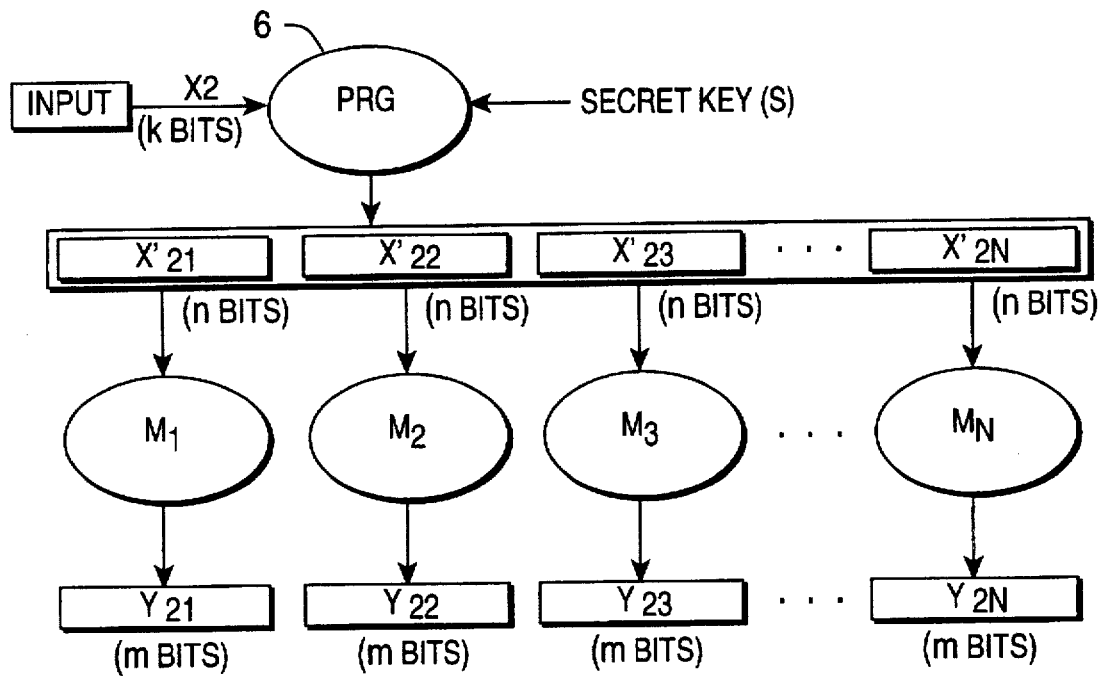
FIG. 5 is a diagrammatic view of a device making it possible starting from a digital signal at input to obtain several digital signals at output which cannot be deduced from the digital input signal.
Figure 6:
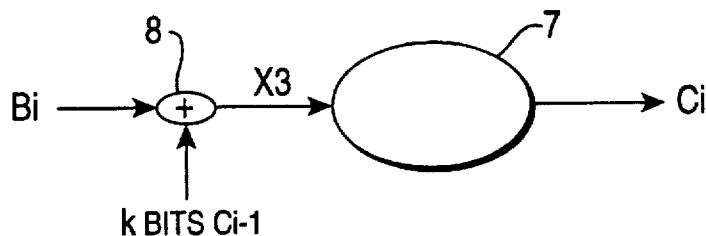
FIGS. 6 and 7 are diagrammatic representations using one of the devices described above to carry out cryptographic verification.
Figure 7:
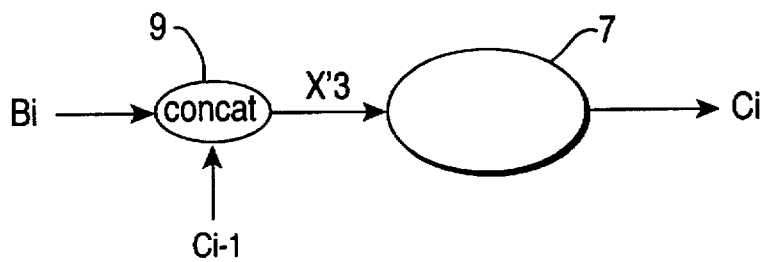

As represented in FIG. 5, the digital signal at input ($x_2$) is dispatched to a pseudo-random generator (6) at the same time as a secret key (S) . If the signal at input is a digital signal of length k bits used to produce signals at output ($x'_{2,1}$), ($x'_{2,2}$), . . . , ($X'_{2,i}$), . . . , ($x'_{2,N}$) having lengths of n bits and approximate weights $d_i$, it is possible to produce N×n bits thereby feeding N matrix multipliers ($M_1$), ($M_2$), ($M_3$), . . . , ($M_N$) , in such a way so as to obtain N digital signals ($Y_{21}$, $Y_{22}$, . . . $Y_{2N}$) at output each having a length of m bits. The matrix used at the level of the multipliers ($M_1$, $M_2$, $M_3$, . . . $M_N$) has the same characteristics as the matrix described with reference to FIGS. 2 to 4. The production of such signals according to a preferential mode requires the use of a reliable pseudo-random generator allowing the generation of around N×n bits. The devices described above can be used in numerous applications. Thus, as represented in FIGS. 6 and 7, the devices described above can be used to calculate a cryptographic error detection code with shared secret keys. This implies that the sender and the receiver share a secret key and the error detection code is calculated and verified using this key. As represented in FIG. 6, a message (M) is divided into blocks containing k bits labelled ($B_i$), i varying from 1to n. We define ($C_0$) to be a fixed digital signal having a length of k bits, it being possible for ($C_0$) to be uniformly null, and the error detection code is defined as ($C_n$) where ($C_i$) is obtained as represented in FIG. 6. In this case, a device corresponding to all of the circuits of FIGS. 2 to 4 is referenced (7). The circuit is defined in such a way that k=m (size of the signal at input is identical to that of the signal at output). At input it receives a digital signal ($X_3$) of k bits from an adder (8) which receives one of the blocks ($B_i$) on one input and on the other input k bits of a digital signal ($C_{i-1}$) which is in fact the signal from the circuit (7) at the previous step so as to give the signal ($C_i$).

If k is greater than m, there is another way of adjoining k-m bits of a message to an output word. In this case, the message (M) which is a binary word is divided into blocks of k-m bits, ($B'_1$), ($B'_2$), . . . , ($B'_n$). As represented in FIG. 7, ($B'_i$) is input to a concatenation circuit (9) together with ($C_{i-1}$) which is a signal of size m bits, the binary word ($x'_3$) from the concatenation circuit is dispatched to a circuit (7) such as defined above in order to obtain the word ($C_i$).

Figure 8:
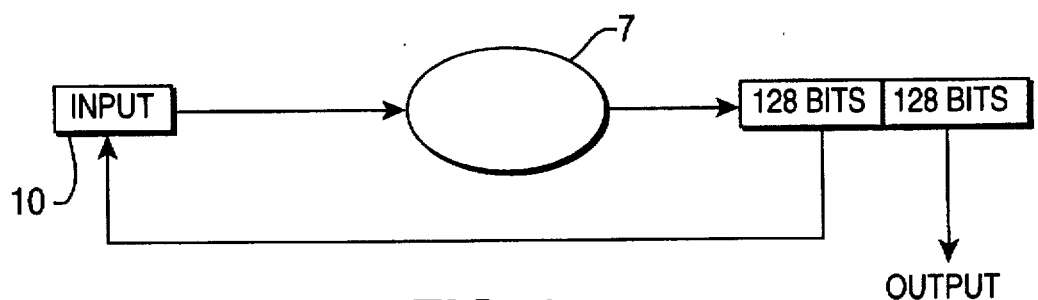
FIG. 8 is a diagram showing the use of the device of FIGS. 2, 3 and 4 to construct a random generator.

Moreover, the circuit described in FIGS. 2, 3 and 4 can also be used as a pseudo-random binary generator when the signal at input is of smaller size than the signal at output. For example, as represented in FIG. 8, if the input signal consists of binary words of k bits, with k<m the following scheme may be used: calculate the image of the input, take the first m-k bits for the random sequence at output, and use the succeeding k bits for create a new input word. This is represented in FIG. 8. In this figure, an input word 10 is dispatched to the circuit 7. The m-bit output word from the circuit 7 is separated into two, the m-k bits at the start being dispatched to the output, as forming the output of a pseudo-random generator, the remainder being fed back in as seen earlier. In the embodiment represented, k=m−k=128 bits. It is obvious that k may be different from m-k.

In the case of such use as, pseudo-random generator, the scrambling system may be omitted.

It is obvious to those skilled in the art that the system described above can be used in numerous ways in the field of cryptography applied to secure systems, such as subscription television, banking systems, secure access systems, etc.

We claim:

1. Method of processing a first digital signal of dimension k, in a so-called secure communication system, such that a second digital signal at output cannot be deduced from the first digital signal at input, comprising dispatching the first digital signal to a device comprising a circuit C and a second circuit effecting a one-way function, characterized in that the processing includes the following steps:

the first digital signal at the input is dispatched to the circuit C modifying said first signal to give as output a third digital signal of another dimension n having the feature necessary to be applied to the device effecting the one-way function;

the third signal output from the circuit C is dispatched to the second circuit effecting the one-way function giving as output the second digital signal.

2. Method according to claim 1, wherein the circuit C comprises a scrambling circuit receiving the first digital signal as input and a formatting circuit for receiving an intermediate signal output from the scrambling circuit and giving as output the third digital signal for input to the second circuit effecting the one-way function.

3. Method according to claim 2, wherein the formatting circuit comprises a permutation generation circuit, the permutation thus defined being applied to the third digital signal of dimension n and of Hamming weight d.

4. Method according to claim 2, wherein the formatting circuit comprises a lexicographic sorting circuit.

5. Method according to claim 1, wherein the circuit C comprises a pseudo-random generator whose seed consists of the first digital signal at input, the generator giving as output the third digital signal of dimension n and with a high probability of Hamming weight d.

6. Method according to claim 1, characterized in that the circuit C is controlled by another digital signal (S) termed the secret key.

7. Method according to claim 6, wherein the secret key is a binary signal of dimension n and of Hamming weight approximately d.

8. Method according to claim 1, wherein the one-way function is obtained by multiplying the third digital signal in binary form by a binary matrix.

9. Method according to claim 8, wherein the matrix is of dimension m×n, n representing the number of columns of the matrix.

10. Method according to claim 9, wherein the binary matrix is randomly generated.

11. Method according to claim 10, wherein the coefficients $a_{ij}$ of the matrix M are generated by a pseudo-random circuit.

12. Method according to claim 9, wherein the parameters d, n, m giving the Hamming weight (d) and the dimensions of the matrix M (n,m) are chosen substantially below the Gilbert-Warshamov bound, namely:

$$m=n\times H_2(d/n)$$

Where $H_2(y)$ is the entropy function:

$$H2(y)=-y\times\log_2(y)-(1-y)\times\log_2(1-y).$$

13. Method according to claim 12, wherein the dimensions of the matrix are n and m=n/2, and in that the Hamming weight (d) is equal to 0.11×n.

14. Method according to claim 4, characterized in that the signal from the pseudo-random generation circuit is dispatched to N circuits effecting a unidirectional function in such a way that to obtain at output N signals having a length of m bits.

15. Method according to claim 1, characterized in that it is used to generate a control word within access control systems.

16. Method according to claim 15, characterized in that, in the case of a subscription television system, the control word or words are generated using the same one-way function at sender level and at receiver(s) level.

17. Method according to claim 1, characterized in that it is used to calculate a code of cryptographic error detection with shared secret keys.

18. Method according to claim 1, characterized in that it is used to build a pseudo-random generator.

* * * * *